(12) United States Patent
Heselhaus

(10) Patent No.: US 7,670,675 B2
(45) Date of Patent: *Mar. 2, 2010

(54) HIGH-TEMPERATURE LAYERED SYSTEM FOR DISSIPATING HEAT AND METHOD FOR PRODUCING SAID SYSTEM

(75) Inventor: Andreas Heselhaus, Düsseldorf (DE)

(73) Assignee: Siemens Aktiengesellschaft, Munich (DE)

( * ) Notice: Subject to any disclaimer, the term of this patent is extended or adjusted under 35 U.S.C. 154(b) by 642 days.

This patent is subject to a terminal disclaimer.

(21) Appl. No.: 10/578,425

(22) PCT Filed: Oct. 12, 2004

(86) PCT No.: PCT/EP2004/011429

§ 371 (c)(1),
(2), (4) Date: Mar. 29, 2007

(87) PCT Pub. No.: WO2005/049312

PCT Pub. Date: Jun. 2, 2005

(65) Prior Publication Data

US 2007/0275210 A1    Nov. 29, 2007

(30) Foreign Application Priority Data

Nov. 14, 2003  (EP)  ................... 03026281

(51) Int. Cl.
*B32B 5/14*   (2006.01)
*B32B 15/00*  (2006.01)
*F01D 5/14*   (2006.01)
*F23R 3/00*   (2006.01)
*F01D 5/28*   (2006.01)
*B32B 18/00*  (2006.01)

(52) U.S. Cl. ................. 428/304.4; 428/116; 428/310.5; 428/314.2; 428/316.6; 428/318.4; 156/77; 164/47

(58) Field of Classification Search ....................... None
See application file for complete search history.

(56) References Cited

U.S. PATENT DOCUMENTS

| 3,825,364 A   | 7/1974 | Halila et al. |
| 3,900,629 A   | 8/1975 | Spencer |
| 4,318,666 A   | 3/1982 | Pask |
| 5,080,557 A   | 1/1992 | Berger |
| 6,235,370 B1  | 5/2001 | Merrill et al. |
| 6,412,541 B2  | 7/2002 | Roesler et al. |
| 7,402,335 B2* | 7/2008 | Bolms et al. ............. 428/310.5 |

FOREIGN PATENT DOCUMENTS

| DE | 43 38 457 A1   | 5/1995 |
| JP | 10231704 A     | 9/1998 |
| WO | WO 03/006883 A1 | 1/2003 |

* cited by examiner

*Primary Examiner*—Ling Xu

(57) ABSTRACT

Layered systems in prior art are inefficient at cooling an external hot gas. The inventive layered system comprises an external porous layer, in which the pore walls of the pores have differing thicknesses. This improves the cooling action by preventing too much heat from entering the layered system.

20 Claims, 14 Drawing Sheets

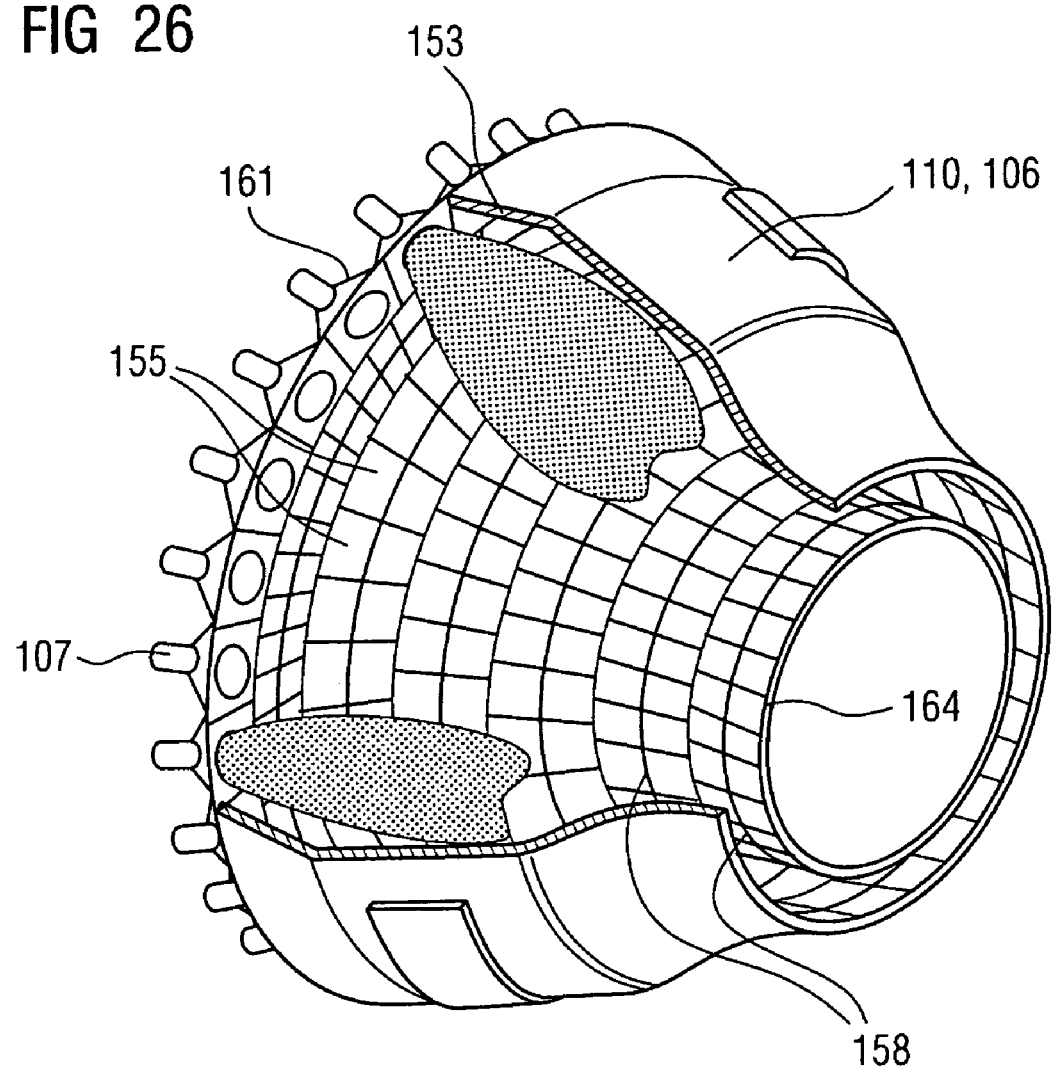

HIGH-TEMPERATURE LAYERED SYSTEM FOR DISSIPATING HEAT AND METHOD FOR PRODUCING SAID SYSTEM

CROSS REFERENCE TO RELATED APPLICATIONS

This application is the U.S. National Stage of International Application No. PCT/EP2004/011429, filed Oct. 12, 2004 and claims the benefit thereof. The International Application claims the benefits of European application No. 03026281.0 EP filed Nov. 14, 2003, both applications are incorporated by reference herein in their entirety.

FIELD OF THE INVENTION

The invention relates to a layer system and a process for producing a layer system.

BACKGROUND OF THE INVENTION

U.S. Pat. No. 3,825,364 shows an outer wall which is completely porous in form. A cavity is present between this supporting wall and a substrate.

U.S. Pat. No. 5,080,557 shows a layer structure comprising a substrate, a porous interlayer and an absolutely impervious outer layer.

U.S. Pat. No. 4,318,666, compared to U.S. Pat. No. 5,080,557, shows additional cooling passages in the substrate, to which a porous interlayer and an impervious outer layer have been applied.

JP 10-231 704 shows a substrate with cooling passages and a porous interlayer.

WO03/006883 and U.S. Pat. No. 6,412,541 show a porous structure within a supporting wall, the wall once again having a coating on the outer side. The wall and the coating have cooling passages.

However, the layer structures are inadequately cooled.

SUMMARY OF THE INVENTION

Therefore, the object of the invention is to improve the cooling in a layer structure.

The object is achieved by the layer structure and the process for producing a layer structure as claimed in the claims.

Further advantageous measures are listed in the subclaims. The measures listed in the subclaims can be combined with one another in advantageous ways.

BRIEF DESCRIPTION OF THE DRAWINGS

Exemplary embodiments of the invention are explained in the figures, in which:

FIG. 26 shows a combustion chamber.

DETAILED DESCRIPTION OF THE INVENTION

Figure 1:
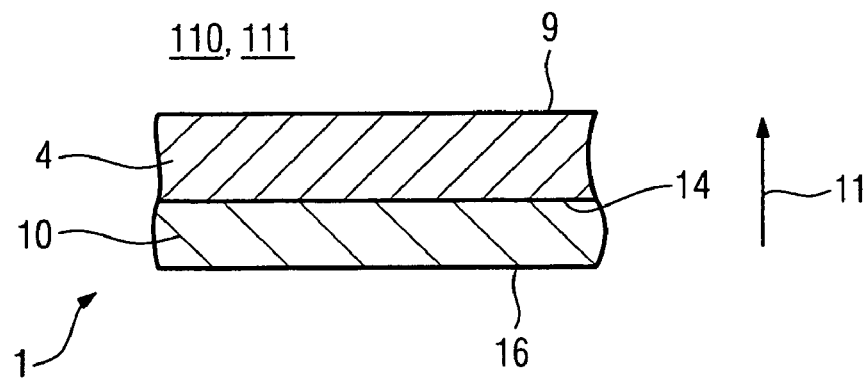
FIGS. 1 to 6 show examples of layer systems in cross section.

FIG. 1 shows a first exemplary embodiment of a layer system 1 according to the invention.

The layer system 1 comprises a substrate 4. The substrate 4 may be metallic and/or ceramic. In particular when used for turbine components of a turbomachine, such as a gas turbine 100 (FIG. 25, although an aircraft turbine is also possible) or a steam turbine, such as for example turbine blades or vanes 120, 130 (FIG. 25) or combustion chamber linings 155 (FIG. 26), the substrate 4 is an iron-base, nickel-base or cobalt-base superalloy.

Figure 25:
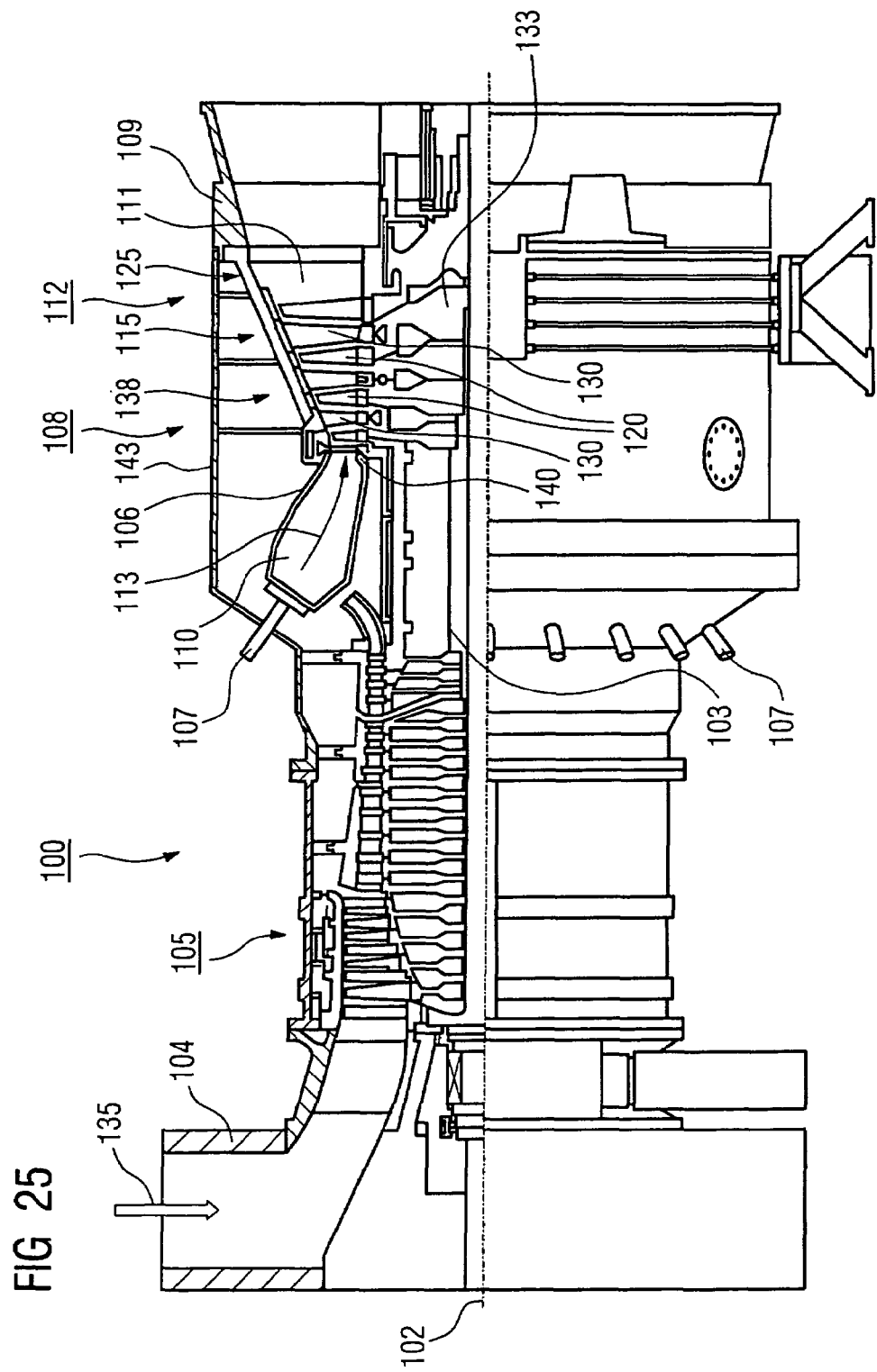
FIG. 25 shows a gas turbine.

The substrate 4 of the layer system 1, at a surface 9, directly or indirectly adjoins a region 110, 111 (FIG. 25) which is exposed to a hot medium. This region 110, 111 is, for example, a combustion chamber 110 or a hot-gas duct 111 of a gas turbine 100 (FIG. 25). Layers (MCrAlX) which protect against oxidation and corrosion and/or thermal barrier coatings (ZrO2) may be present on the surface 9 in a known way.

A radial direction 11 runs perpendicular or virtually perpendicular to the surface 9 of the substrate 4.

Despite these measures protecting against excessive introduction of heat, the substrate 4 is also additionally cooled at a surface 14 which lies on the opposite side from the surface 9. In this case, therefore, the layer system 1 is, for example, a hollow component (e.g. a hollow turbine blade or vane) with an inner surface 14. The substrate 4 is cooled by a cooling medium KM being passed through the hollow component so as to dissipate the heat from the substrate 4 at the surface 14. According to the invention, this takes place through a porous layer 10 which is present on the surface 14 of the substrate 4 in order to allow better dissipation of this heat to the cooling medium.

A, for example, metallic bonding layer may be present between the porous layer 10 and the substrate 4.

The statements made above in connection with the layer system having the substrate 4 and the layer 10 also apply analogously to the layer system having the substrate 4/interlayer and layer 10.

Figure 2:
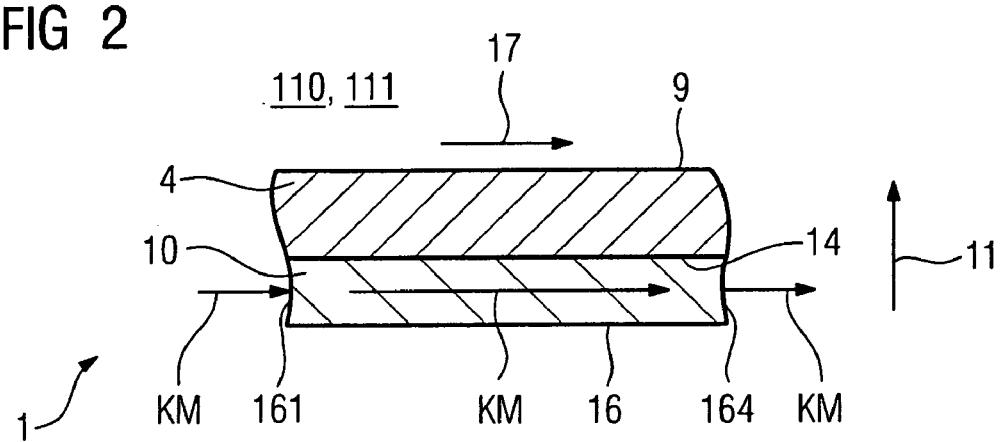
Figure 3:
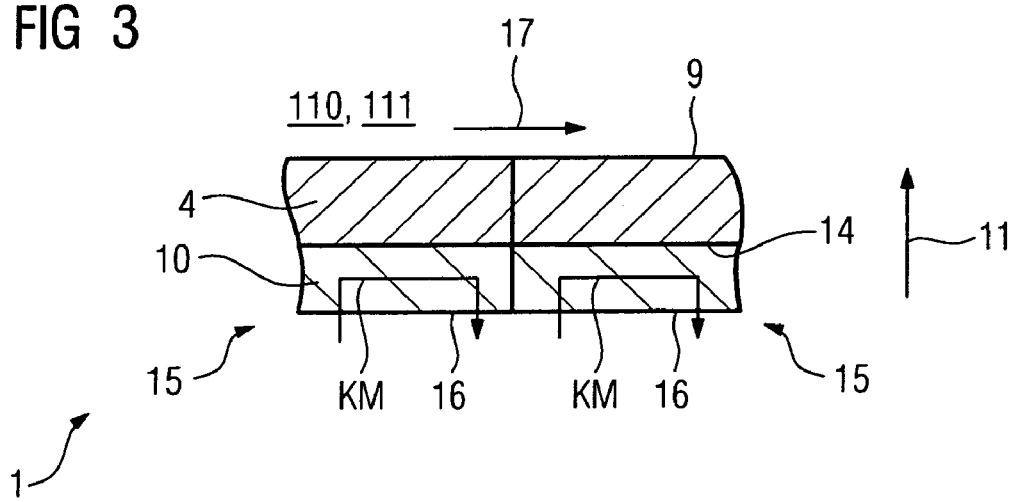
Figure 4:
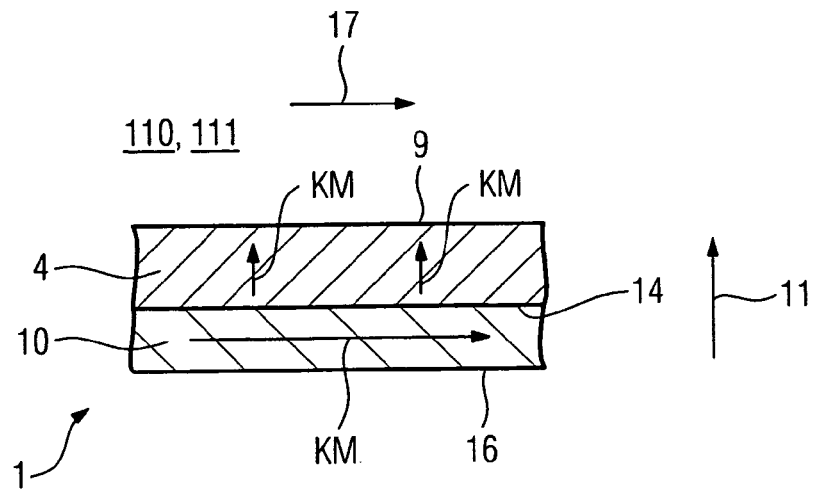

The cooling medium KM can flow past the free surface of the porous layer 10 or can at least partially flow through the porous layer 10 (FIGS. 2, 3, 4).

FIGS. 2, 3, 4 show how a cooling medium KM can flow through this porous layer 10.

In FIG. 2, the cooling medium flows in an axial direction 17 (flow of a hot gas in 110, 111, perpendicular to the radial direction 11) through the entire porous layer 10.

In the case of the combustion chamber 110, the cooling medium KM is supplied at one end and flows from one axial end 161 to the other end 164 (FIG. 26). In this case, the porous layer comprises, for example, tubes extending in the axial direction 17.

Other arrangements are conceivable.

The same applies to the hot-gas duct 111.

It is also possible for the porous layer 10 to be split in the axial direction 17 into a number of segments 15 (FIG. 3), in which case the cooling medium KM is in each case fed to each segment 15 separately and then flows through the said segment.

In the case of the combustion chamber 110 (FIG. 26), by way of example the heat shield element 155 (FIG. 26) corresponds to the segment 15.

Figure 7:
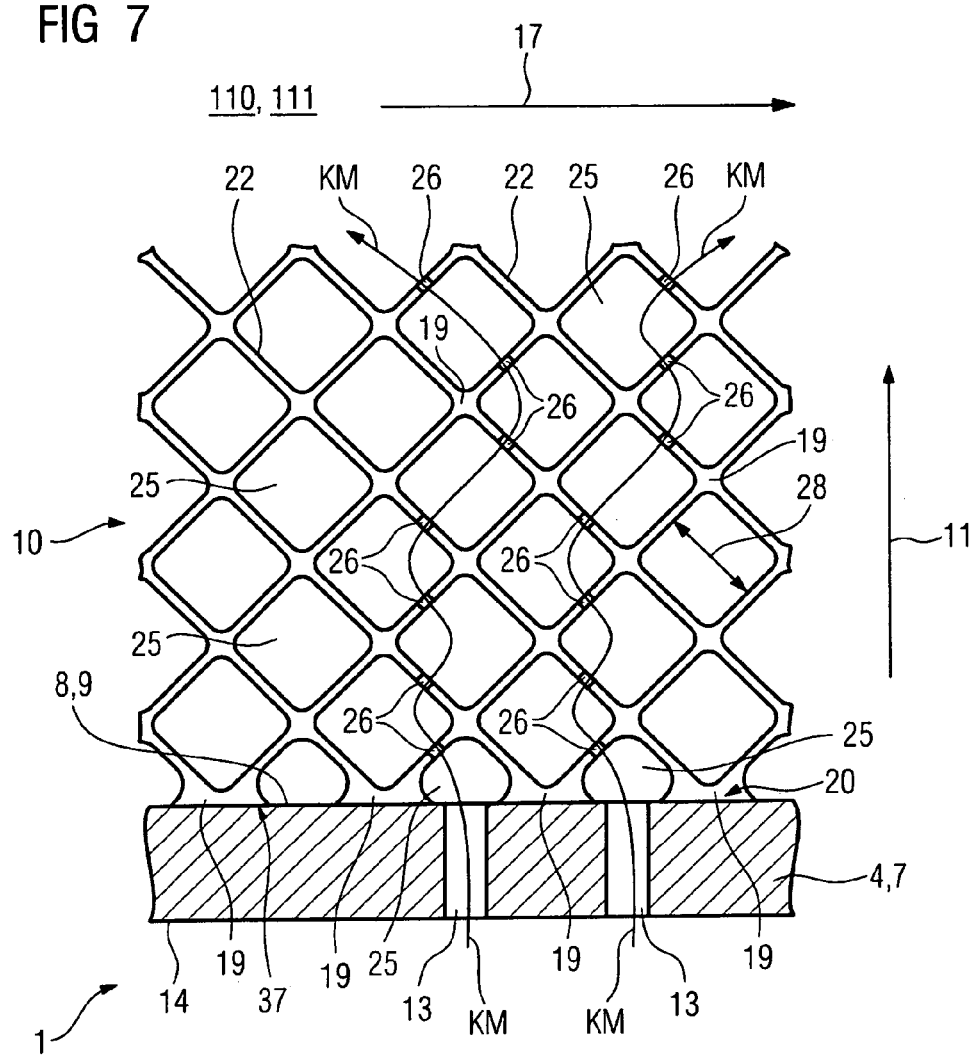
FIGS. 7 to 17 show an enlarged view of a porous layer.

The segments 15 prevent the cooling medium KM from flowing through the porous layer 10 horizontally (in the axial direction 17) and being excessively heated on account of the pressure difference in the hot-gas duct 111 or in the combustion chamber 110. Chamber walls can be formed by filling pores 25 (FIG. 7) in the radial direction 11, or alternatively a perpendicular flow through the porous layer 10 is achieved by a suitable arrangement of the passages 26 (FIG. 7). This is also shown in WO03/006883, which forms part of the present disclosure with regard to the arrangement of segments or chambers and the flow through them.

In the arrangement shown in both FIG. 2 and FIG. 3, it is possible for cooling passages to be provided in the substrate 4, allowing a cooling medium KM to flow out of the porous layer 10 through the substrate 4 (FIG. 4). In this case, film cooling can be produced on the surface 9 of the substrate 4 or of a layer on the substrate 4 by virtue of the cooling medium KM flowing out of the surface 9.

Figure 5:
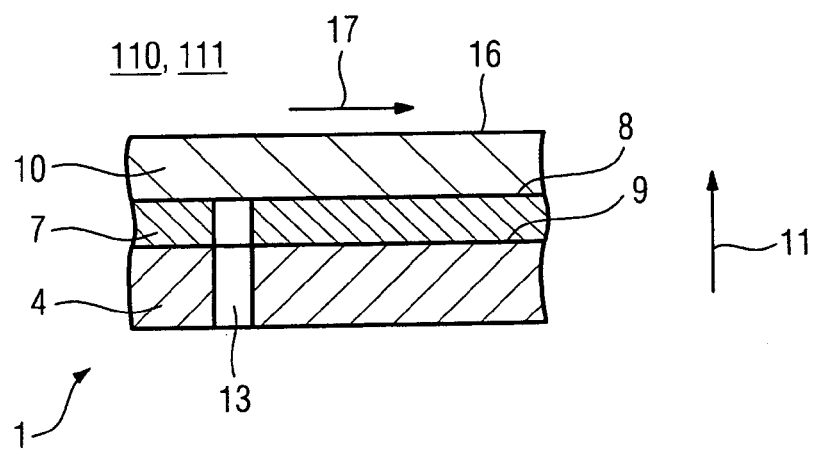

FIG. 5 shows a further exemplary embodiment of a layer system 1 according to the invention.

The layer system 1 comprises a substrate 4. The substrate 4 may be metallic and/or ceramic. In particular when used for turbine components of a gas turbine 100 (FIG. 25) or a steam turbine, such as for example turbine blades or vanes 120, 130 (FIG. 25) or combustion chamber linings 155 (FIG. 26), the substrate 4 is an iron-base, nickel-base or cobalt-base superalloy.

By way of example, at least one interlayer 7 is present on the substrate 4. The interlayer 7 may be metallic and/or ceramic. The outer porous layer 10 is applied to the surface 8 of the interlayer 7. This porous layer 10 may likewise be metallic and/or ceramic.

By way of example, a cooling passage 13, through which a cooling medium (air and/or steam or another cooling medium) can be supplied, leads through the substrate 4 and the interlayer 7. The cooling medium, which flows into the porous layer 10 via the cooling passage 13, can flow within the layer 10 or can emerge from the surface 16 of the outer layer 10. If the cooling medium emerges from the surface 16, effusion cooling takes place.

In terms of the supply and flow of the cooling medium KM, the statements which have been made in connection with FIGS. 2, 3 and 4 apply accordingly.

Figure 6:
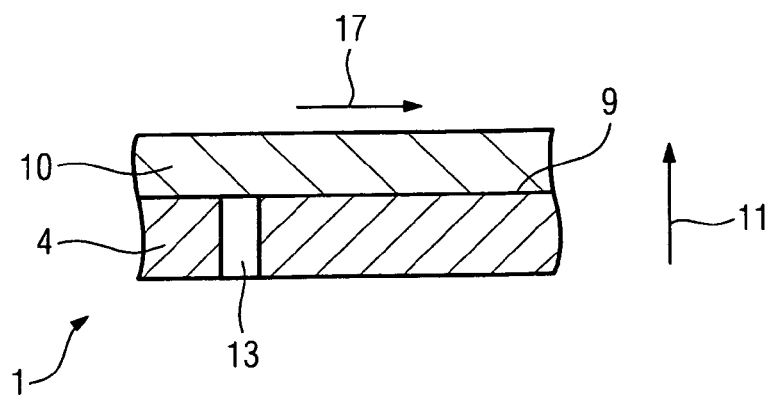

The interlayer 7 is, for example, an oxidation-resistant or corrosion-resistant layer, for example having the composition MCrAlX, where M stands for at least one element selected from the group consisting of iron, cobalt or nickel. X stands for at least one element selected from the group consisting of yttrium and/or the rare earths or an active element. The interlayer 7 may also be a platinum layer or a platinum-enriched MCrAlX layer FIG. 6 shows a further exemplary embodiment of a layer system 1 formed in accordance with the invention. Compared to FIG. 1, there is no interlayer 7, but rather the outer porous layer 10 rests directly on the surface 9 of the substrate 4.

The material for the layer 10 is, for example, formed from silicon carbide (SiC), silicon oxide ($SiO_2$), silicon nitride ($Si_3N_4$) or fiber materials (CMC) or mixtures thereof.

The layer 10 may be formed integrally with the substrate 4 or the interlayer 7, so that there are no bonding problems between layer 10 and substrate 4.

The porous layer 10 may, for example, have been produced together with the substrate 4 in a single casting operation or by other melt metallurgy processes (epitaxial growth). This effects an ideal join between substrate 4 and porous layer 10 in terms of heat transfer and mechanical strength between substrate 4 and layer 10 or interlayer 7.

FIG. 7 shows an enlarged illustration of the outer layer 10, which extends in a radial direction 11 (perpendicular to the substrate 4). Here, the porous layer 10 adjoins the region 110, 111, i.e. it rests on the surface 9 of the substrate 4. The following statements relating to the formation of the porous layer 10 and the bonding to the substrate 4, however, also apply to the arrangement of the porous layer 10 on the substrate 4 in accordance with FIGS. 1, 2, 3 and 4.

The outer porous layer 10 comprises a large number of pores 25. The pore size varies from approximately 0.5 millimeter to several millimeters ($\geq 2$ mm). A pore 25 is in each case surrounded by pore walls 22. The pore walls 22 of the individual adjacent pores 25 meet at a wall section surface 19. A cooling medium KM can flow through the porous layer 10 by virtue of being supplied from the interior of the layer system (hollow turbine blade or vane, inside a combustion chamber) 1, although it does not have to do so, since the porous layer 10 acts as a thermal barrier coating and therefore already makes a contribution to relieving the thermal stresses in the substrate.

Between the pores 25, passages 26 may be present in the pore walls 22, through which a cooling medium KM can flow. A meandering arrow line shows how a cooling medium can flow from the substrate 4 out through the porous layer 10. For example, the cooling medium KM may flow through the porous layer 10 in the radial direction 11.

If the cooling medium KM is to flow through the porous layer 10 in the axial direction 17, the passages 26 are not required.

The pores 25 have a pore diameter or pore width 28. In this exemplary embodiment, in cross section perpendicular to the radial direction 11 the pores 25 have a virtually square or right-angled cross section.

The porous layer 10 is, for example, arranged on the substrate 4 or an interlayer 7 in such a way that a plurality of wall section surfaces 19 form a contact surface 37 with the substrate 4. Therefore, the substrate 4 or the interlayer 7 adjoins wall section surfaces 19 and pores 25.

Edges of the pore walls 22, of the passages 26 or of the wall section surfaces 19 are at least rounded, so that dirt particles which manage to enter the porous layer 10 with the cooling medium cannot become snagged at the edges.

The pore size 28 is, for example, designed to be sufficiently large for foreign particles which flow through the layer 10 with the cooling medium not to block the porous layer 10, i.e. the pore size 28 is larger than the size of the foreign particles. In particular, the porous layer 10 has a honeycomb structure.

A transition 20 between a pore wall 22 or wall section surface 19 and the substrate 4 or the interlayer 7 is widened and designed to have the largest possible area with large rounding radii, in order to reduce thermal stresses and notch effects and in order to increase the size of the contact surface 37 between layer 10 and substrate 4 or interlayer 7, so as to produce good mechanical bonding and heat transfer between the porous layer 10 and the substrate 4 or the interlayer 7.

Figure 12:
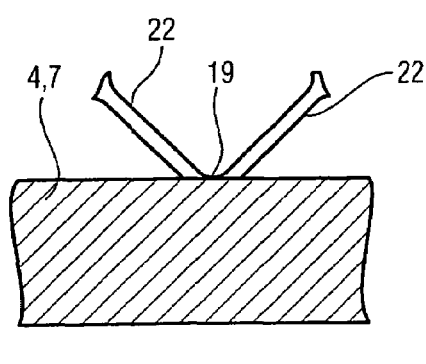
Figure 13:
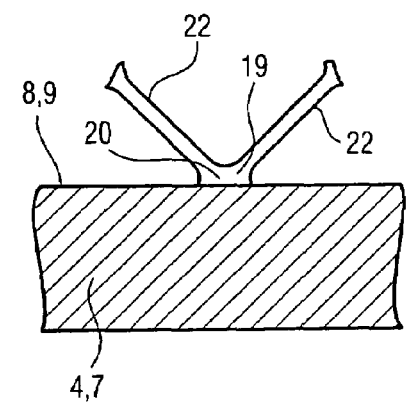

In particular, the contact surface 37 of the layer 10 with the substrate 4 or the interlayer 7 is produced by the wall section surface 19 (FIG. 12, Prior Art). The size of the wall section surface 19 according to the invention is correspondingly widened at the transition 20 compared to the cross section of the wall section surface of this pore 25 above the transition 20 (FIG. 13).

Figure 14:
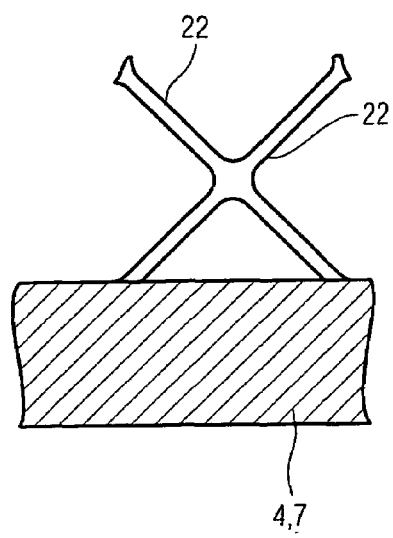
Figure 15:
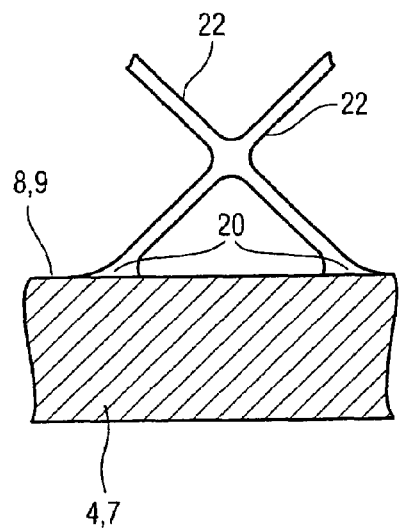

If the pore walls 22 form the contact surface to the substrate 4 or the interlayer 7 (FIG. 14, Prior Art), the cross section of the transition 20 is correspondingly widened compared to the thickness of the pore wall 22 above the contact surface (FIG. 15).

Figure 16:
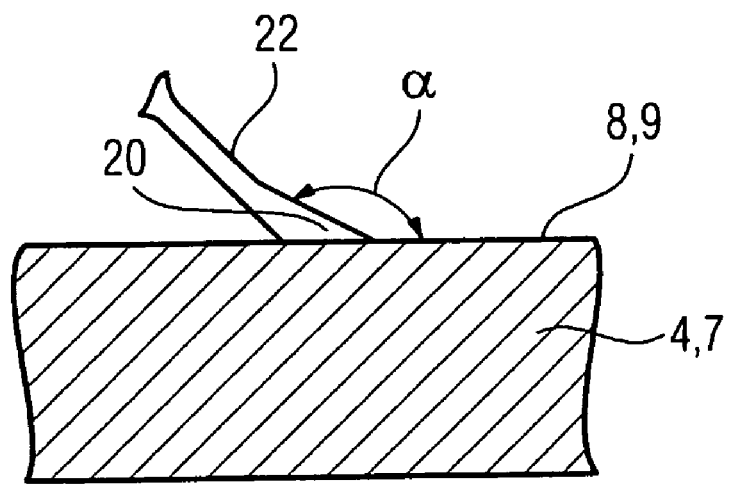
Figure 17:
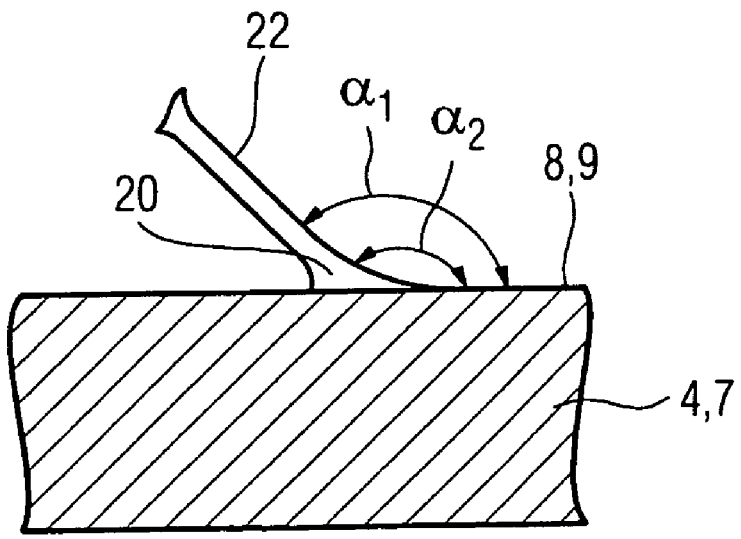

The widening of the transition 20 is designed in such a way as to produce a discontinuous transition (FIG. 16) (a defined angle α) or a continuous transition (FIG. 17) (different angles α1, α2, . . . ) from the pore wall 22 to the surface 9, 14.

The surface 9 of the substrate 4, which is covered by the porous layer 10, is therefore largely (>10%, in particular >20% or >30%) in contact with the wall section surfaces 19 or the pore walls 22.

Figure 9:
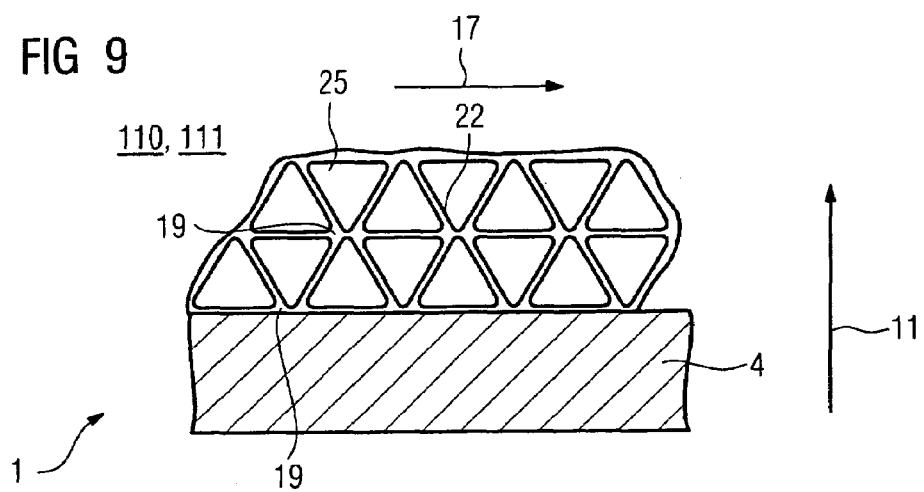

FIG. 9 shows a further cross-sectional form of the pores 25. The cross section of the pores 25 is, for example, triangular in form. Further cross-sectional forms are conceivable.

Figure 8:
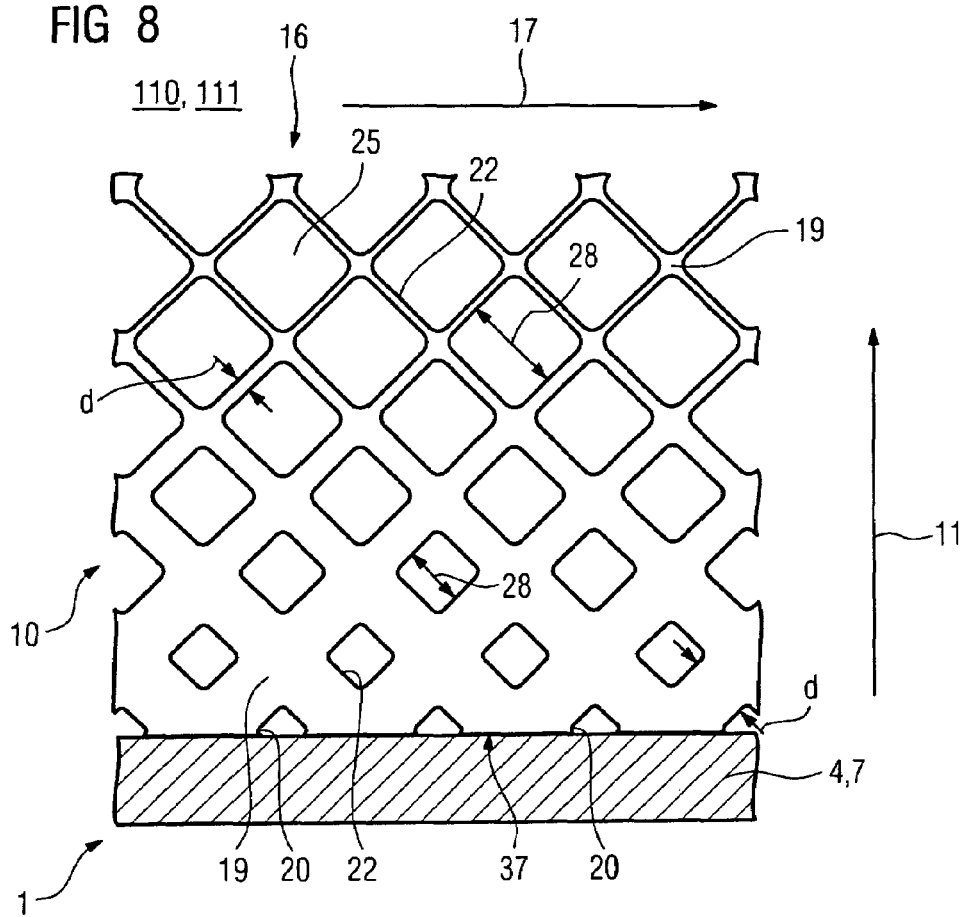

FIG. 8 shows a further exemplary embodiment of a layer system 1 according to the invention.

Along the radial direction 11, the pore walls 22 are designed to be thicker in the vicinity of the substrate 4 or the interlayer 7 (thickness, diameter d) than in the vicinity of the outer surface 16 of the porous layer 10. Therefore, the pore width 28 also changes in the radial direction 11; specifically, the pore width 28 is smaller in the region close to the substrate 4 than in the region close to the outer surface 16 of the substrate 4. The thicker pore walls 22 in the vicinity of the substrate 4 or the interlayer 7 produces a larger contact surface 37 between the porous layer 10 and the substrate 4 (>10% of the area covered by the porous layer 10). This increases the mechanical bonding and the heat transfer between the porous layer 10 and the substrate 4 or the interlayer 7.

The transition 20 between a pore wall 22 and the substrate 4 or the interlayer 7 is, for example, likewise widened (FIGS. 13, 15, 16, 17).

The porous layer 10 can be produced separately in a known way and joined to the substrate 4 for example by soldering.

However, it is also possible for the porous layer 10 to be built up directly on the substrate 4.

The following statements apply to the arrangement of the layer 10 on the substrate 4 in accordance with FIGS. 1 to 4. In general, the transition 20 between the pore walls 22 or the wall section surfaces 19 of the layer 10 and the solid load-bearing substrate 4 represents a mechanical weak point. In particular in the event of sudden temperature fluctuations, as are inevitable when operating gas or steam turbines, a uniformly thin, porous structure adopts the new temperature very much more quickly than the solid substrate 4. This is associated with different thermal expansions of these regions, which can lead to extremely high stresses in the transition region between layer 10 and substrate 4. On account of the large-area, more solid configuration of the pore walls 22 in the transitions 20, such effects no longer occur or only occur to a greatly reduced extent.

A constant cross section of the pore walls 22 along the radial direction 11 would also reduce the heat conduction cooling efficiency. All of the heat being produced has to flow from the hot-gas duct 110 via the substrate 4 into the porous structure 10, where it is uniformly dissipated to the cooling air. As a result, heat flows mostly through the pore walls 22 at the surface 14 of the substrate 4 and less so at the free surface 16. If the cross section of the pore wall 22 remains constant, the associated temperature gradient in the porous layer 10 changes analogously to the heat which is flowing, i.e. it is high in the vicinity of the surface 9 and decreases toward the free surface 16. However, since the heat transfer to the cooling air is directly dependent on the temperature difference with respect to the porous structure 10, it is overall only possible for a more restricted amount of heat to be transferred to the cooling air.

The thicker pore walls 22 in the vicinity of the substrate 4 increases the cross-sectional area for heat conduction, so that the temperature gradient in the radial direction 11 flattens out. As a result, it is possible to keep the temperature gradient between the pore walls 22 and a coolant passed through the pores 25, which is a requirement for effective cooling, at as high a level as possible in wide regions at the porous layer 10.

Figure 10:
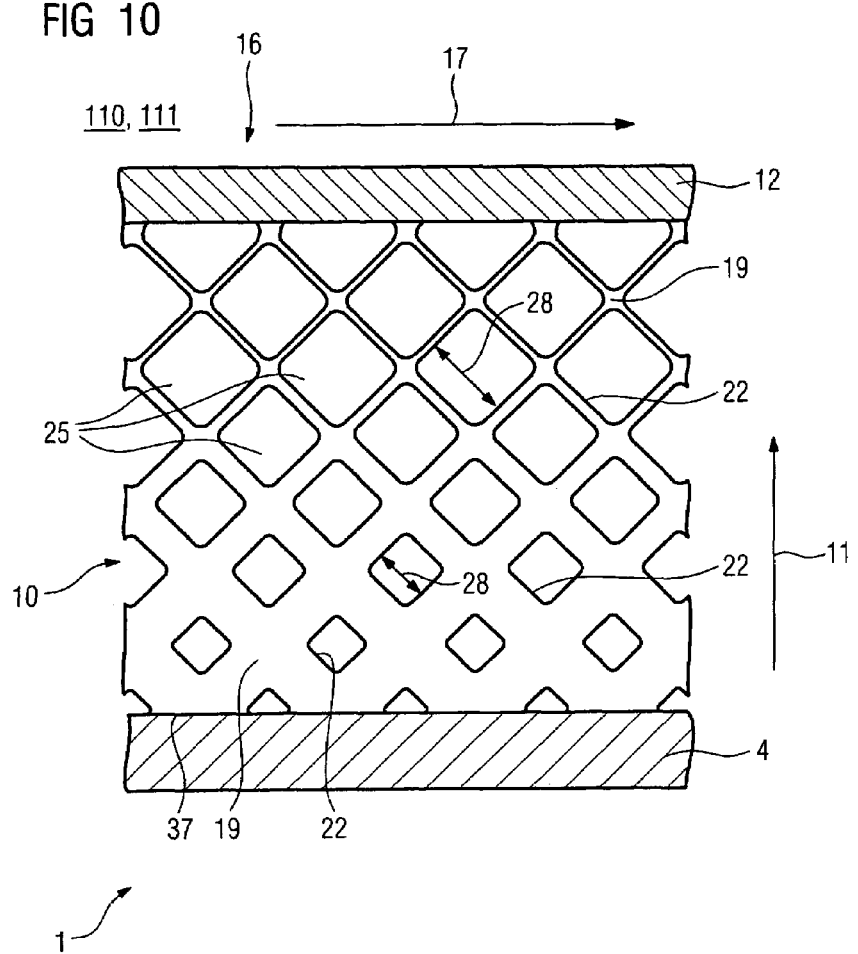

Proceeding from FIG. 8 (but also analogously to FIGS. 7, 9), FIG. 10 shows a further exemplary embodiment of a layer system 1 according to the invention.

A protective layer 12 has been applied to the porous layer 10. In particular if the porous layer 10 is a metallic layer, for example an MCrAlX layer, it is necessary to provide the layer 10 with additional protection against further introduction of heat. In this case, the protective layer 12 is a ceramic thermal barrier coating. The ceramic thermal barrier coating can be applied to the porous layer 10 by means of known coating processes.

The protective layer 12 may also have holes (not shown), out of which a cooling medium can flow (film cooling).

The protective layer 12 may also form a wearing layer.

Figure 11:
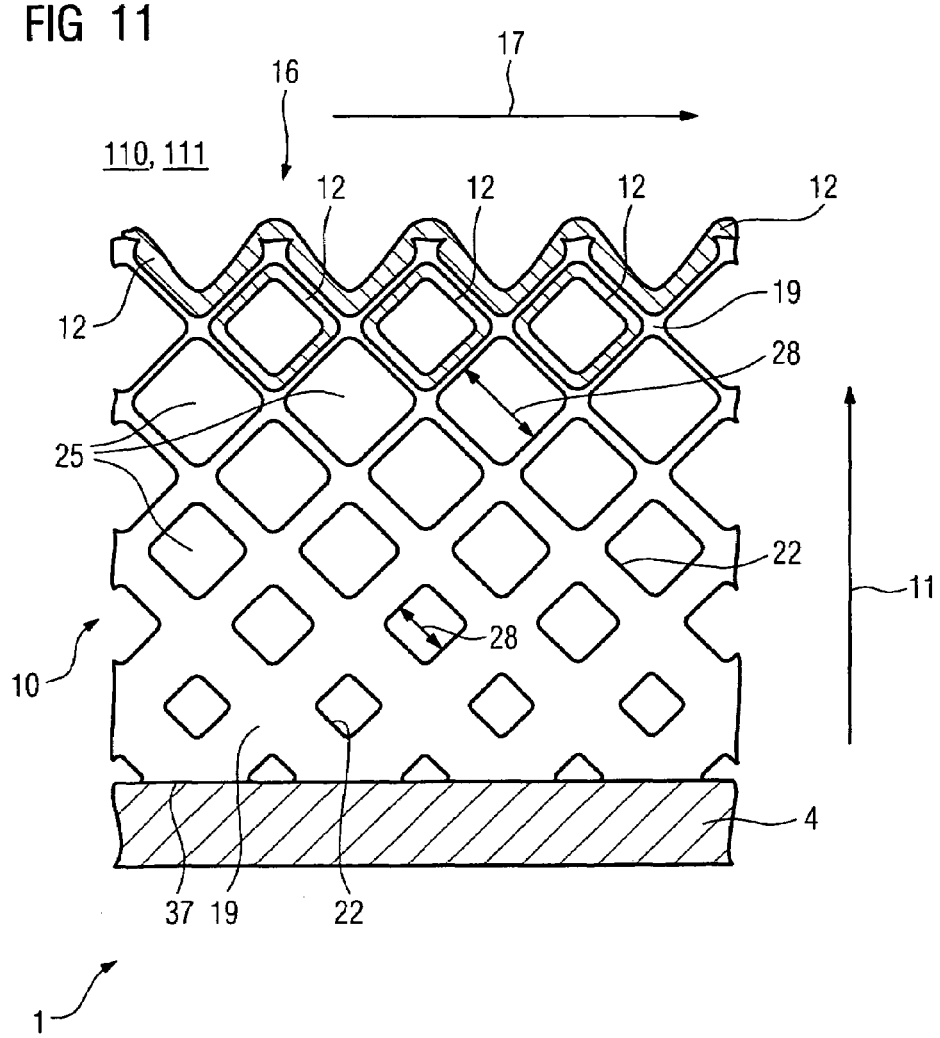

FIG. 11 shows a further exemplary embodiment of a layer system according to the invention proceeding from FIG. 8 (but also analogously to FIGS. 7, 9).

A protective layer 12 has been applied to the pore walls 22. The protective layer 12 does not constitute a layer which has only been applied to the outside of the layer 10, but rather covers the outer surfaces and inner surfaces of the pores 25. The protective layer 12 may be applied in an outer part of the porous layer 10 or may extend all the way to the substrate 4.

If appropriate, gas-permeable connections passing through the protective layer 12 may also be present, so that a cooling medium can also continue to pass out of the porous layer 10 into a hot-gas duct.

The porous layer 10 of the above exemplary embodiments can be produced as follows.

By way of example by means of laser stereolithography, a first negative form of the porous layer 10 is produced in a first layer 10', for example from plastic particles. Since the structure of the porous layer 10 is present for example in a CAD model, the layer 10 can be broken down in virtual form into an appropriate number of layers. A first layer of this type is then produced by means of the laser stereolithography, which joins the plastic particles to one another by curing precisely where pores 25 and passages 26 between pores 25 are present.

It is then possible for the further layers to be produced separately and joined to one another, or alternatively plastic particles are once again applied to the first laser-treated layer, resulting in a second layer on the first layer. The second layer is then likewise treated in a targeted manner using the laser, so that the plastic particles are joined to one another where the laser impinges on them.

In this way, the entire model of the negative form of the porous structure 10 is built up from plastic by means of the CAD model layer by layer. Materials other than plastic are also conceivable.

The negative produced in this way can be filled (if appropriate by casting) with the material of the porous layer 10 and densified. The plastic is then removed by being burnt or leached out.

Figure 23:
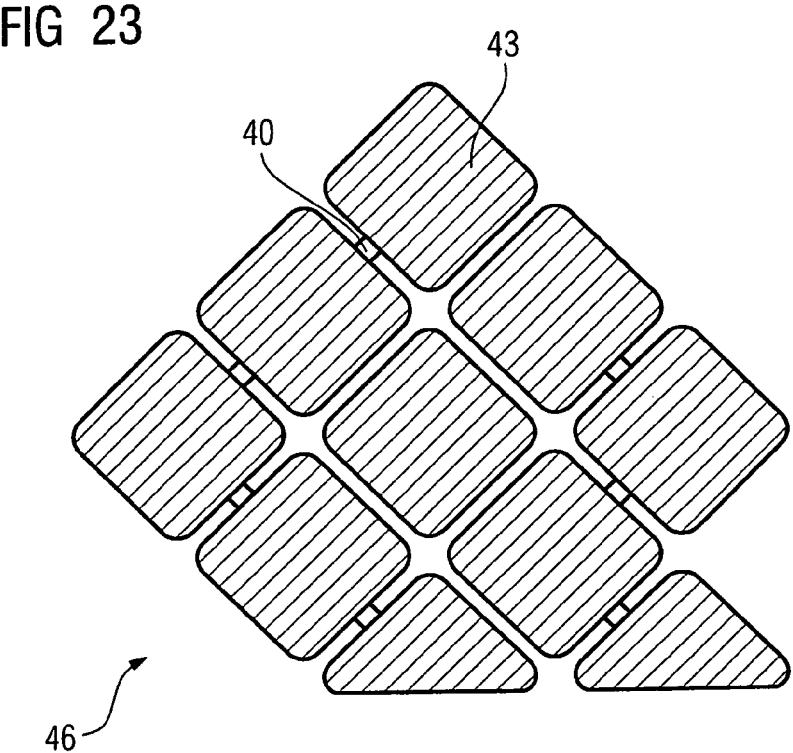
Figure 24:
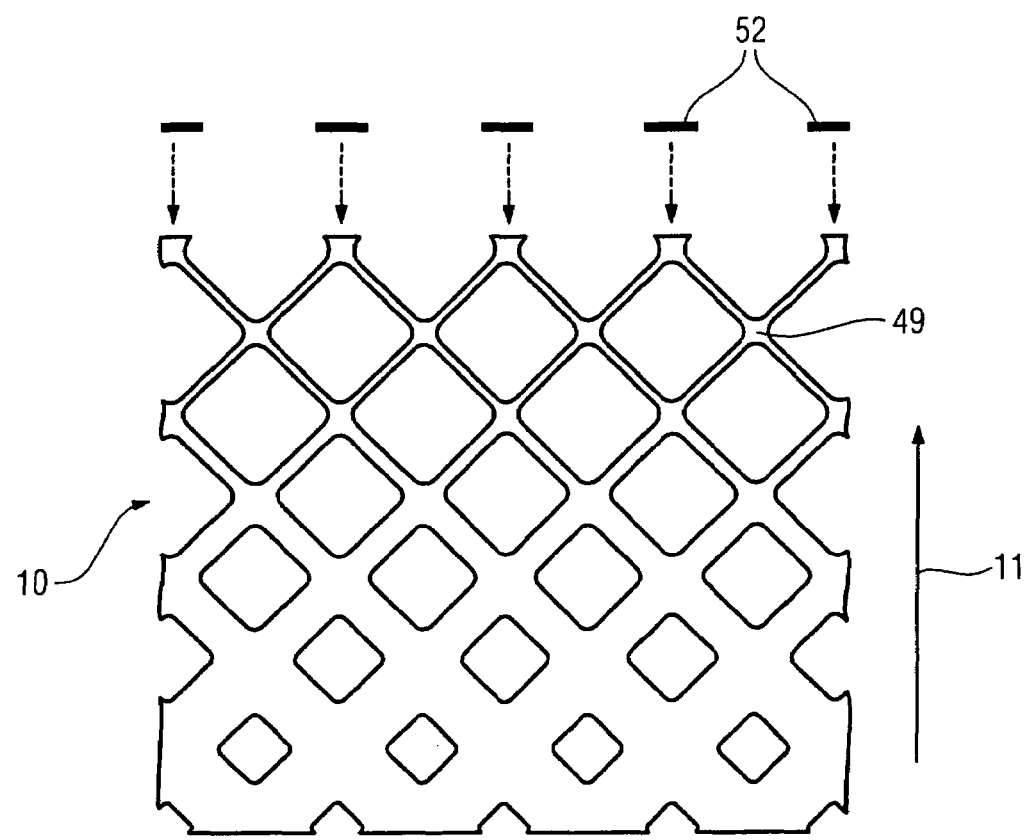

It is also possible to use laser stereolithography to build up a model of the porous layer 10 (FIGS. 7, 8) in such a way that a casting mold 46 (FIG. 23) is formed by duplicate molding of the model, and then the porous layer 10 is formed by casting into the casting mold 46. The casting mold 46 comprises volume bodies 43, the filled pores 25 and if appropriate webs 40 which correspond to filled passages 26.

Further processes for producing the porous layer 10 are conceivable.

In particular, the porous layer 10 can be produced in layers (FIG. 18 to FIG. 22, 24).

In a first process step (FIG. 18), the wall section surfaces 19 which form the contact surface 37 with the substrate 4 are applied to the substrate 4. In this way, a first part 10' of the layer 10 is formed.

Figure 18:
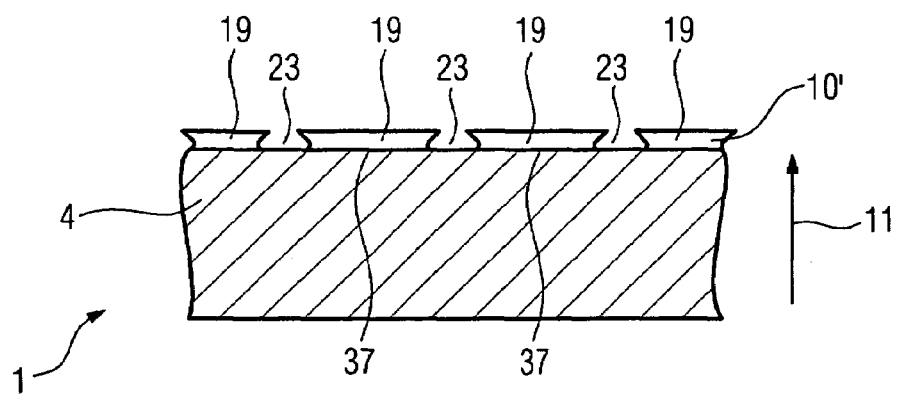
FIGS. 18 to 24 show process steps for producing a layer system according to the invention.
Figure 19:
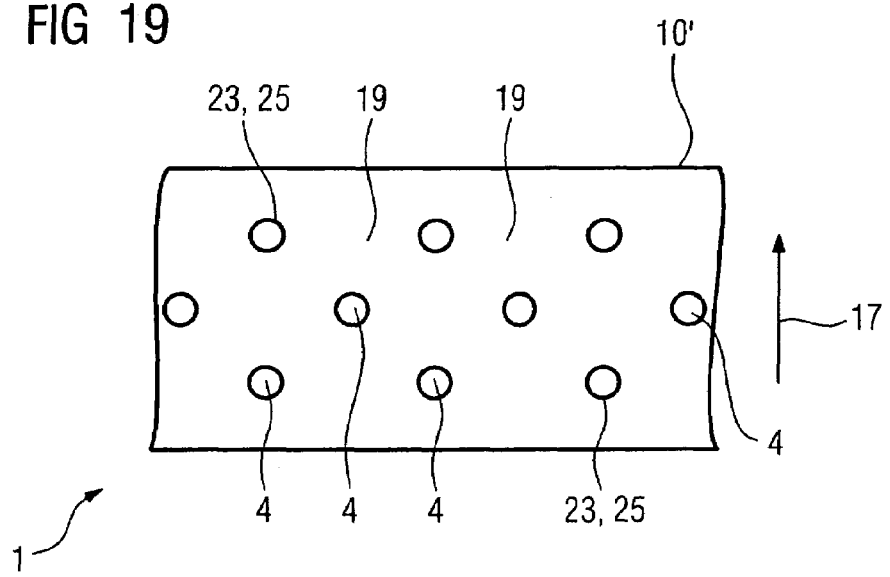

A plan view onto the component 1 from FIG. 18 (FIG. 19) shows that the substrate 4 has been only partially coated with the material of the layer 10. The substrate 4 is uncovered at the locations 23 at which pores 25 are to be formed.

Figure 20:
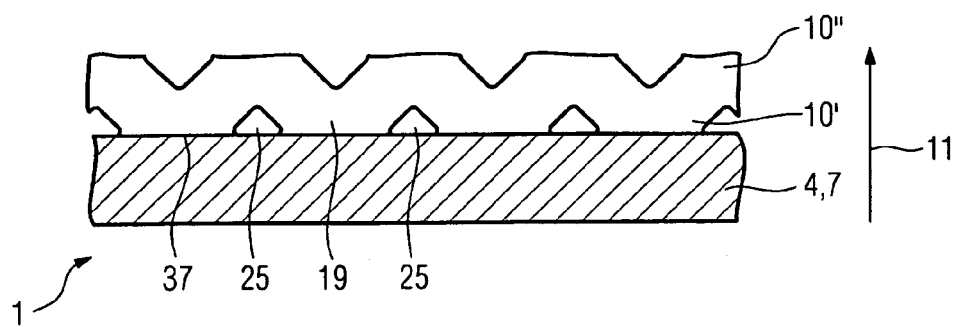
Figure 21:
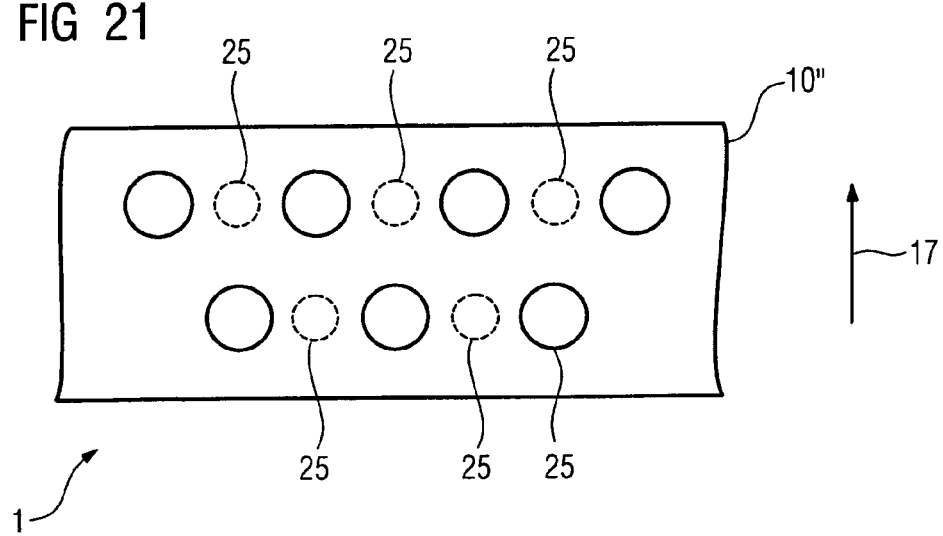
Figure 22:
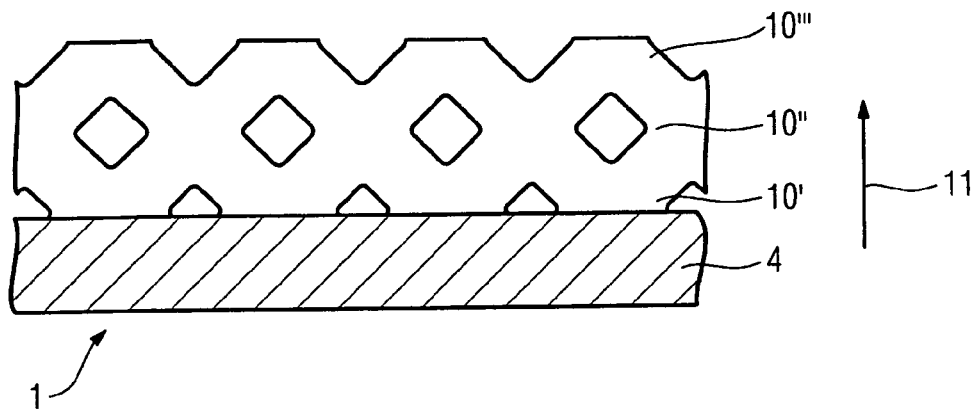

In a further process step, further material is applied to a layer system 1 as shown in FIG. 18 (FIG. 20). The locations 23 can, for example, be filled with a material other than the material of the layers 10', 10", in order to prevent them from being filled. This other material for the locations 23 can be leached or burnt out, whereas the material of the pore walls 22 cannot be removed in this way.

The uncoated locations 23 in accordance with the treatment step presented in FIG. 18 are now closed, so that first pores 25 have formed adjacent to the substrate 4. A further layer region 10" has been added to the layer region 10'.

A plan view (FIG. 21) onto a layer system 1 as shown in FIG. 20 reveals holes in such a surface, which result in the formation of pores 25 following a further layer application. The pores 25 which have by now been closed up are indicated by dashed lines. This procedure is continued in steps (FIG. 22) until a porous layer 10 for example as shown in FIG. 4 results.

FIG. 4 diagrammatically depicts how it is possible to produce a porous layer 10, namely by printing the porous structure.

In this case, similarly to in the case of stereolithography, the structure is built up from individual layers in succession, except that in this case there is no laser fusing together plastic particles, but rather an ultrathin printing paste which contains material of the layer 10, such as for example dye, is printed layer by layer over the layer sequence 49. This process allows the material of the porous layer to be used directly for printing. In this case, the material, for example in the form of a fine powder, is mixed with a binder.

Once the porous layer 10 has been fully printed, the binder is evaporated off in a furnace and then the material of the porous layer 10 is sintered together. There is in this case no need to use a plastic core or to produce a casting mold.

FIG. 25 shows a partial longitudinal section through a gas turbine 100.

In the interior, the gas turbine 100 has a rotor 103 which is mounted such that it can rotate about an axis of rotation 102 and is also referred to as the turbine rotor. An intake housing 104, a compressor 105, a, for example, toroidal combustion chamber 110, in particular an annular combustion chamber 106, with a plurality of coaxially arranged burners 107, a turbine 108 and the exhaust-gas housing 109 follow one another along the rotor 103. The annular combustion chamber 106 is in communication with a, for example, annular hot-gas duct 111, where, by way of example, four successive turbine stages 112 form the turbine 108. Each turbine stage 112 is formed from two blade or vane rings. As seen in the direction of flow of a working medium 113, in the hot-gas duct 111 a row of guide vanes 115 is followed by a row 125 formed from rotor blades 120.

The guide vanes 130 are secured to the stator 143, whereas the rotor blades 120 of a row 125 are fitted to the rotor 103 by means of a turbine disk 133. A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas duct 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield bricks which line the annular combustion chamber 106, are subject to the highest thermal stresses. To be able to withstand the temperatures which prevail there, they have to be cooled by means of a coolant. The blades or vanes 120, 130 may also have coatings which protect against corrosion (MCrAlX; M=Fe, Co, Ni, X=Y, rare earths) and heat (thermal barrier coating, for example $ZrO_2$, $Y_2O_4$—$ZrO_2$).

A porous layer 10, for example as shown in FIGS. 1 to 4, may be applied in the interior of the turbine blades or vanes 120, 130. The porous layer 10 can also delimit the blade or vane 120, 130 in the hot-gas duct 111.

The guide vane 130 has a guide vane root (not shown here) which faces the inner housing 138 of the turbine 108, and a guide vane head which is at the opposite end from the guide vane root. The guide vane head faces the rotor 103 and is fixed to a securing ring 140 of the stator 143.

The combustion chamber 110 in FIG. 26 is configured, for example, as what is known as an annular combustion chamber, in which a multiplicity of burners 102 arranged circumferentially around the turbine shaft 103 open out into a common combustion chamber space. For this purpose, the combustion chamber 110 overall is of annular configuration positioned around the turbine shaft 103.

To achieve a relatively high efficiency, the combustion chamber 110 is designed for a relatively high temperature of the working medium M of approximately 1000° C. to 1600° C. To allow a relatively long service life even with these operating parameters, which are unfavorable for the materials, the combustion chamber wall 153 is provided, on its side which faces the working medium M, with an inner lining formed from heat shield elements 155. On the working medium side, each heat shield element 155 is equipped with a particularly heat-resistant protective layer or is made from material that is able to withstand high temperatures. Moreover, a cooling system is provided for the heat shield elements 155 and/or their holding elements, on account of the high temperatures in the interior of the combustion chamber 110.

A porous layer 10, for example as shown in FIGS. 1 to 4, is then applied in the interior of the holding elements. It is also possible for the porous layer 10 to be arranged on the outside toward the combustion chamber 111.

The combustion chamber 110 is designed in particular to detect losses of the heat shield elements 155. For this purpose, a number of temperature sensors 158 are positioned between the combustion chamber wall 153 and the heat shield elements 155.

The invention claimed is:

1. A layer system, comprising:
   a substrate;
   a porous layer on a surface of the substrate;
   a plurality of pores in the porous layer; and
   a plurality of pore walls delimiting the pores in the porous layer,
   wherein the pore walls which adjoin the surface of the substrate have a larger cross-sectional area than the pore walls which do not adjoin the surface of the substrate, which results in an improved mechanical bonding of the pore walls to the substrate.

2. The layer system as claim in claim 1,
   wherein the pore walls of adjacent pores intersect at wall section surfaces, wherein a size of the wall section surfaces at the surface of the substrate is larger than a size of the wall section surfaces which do not adjoin the surface of the substrate resulting in an improved mechanical bonding of the wall surface section to the substrate.

3. The layer system as claim in claim 1, wherein a contact surface between the pore walls or the wall section surfaces and the substrate is at least 10% of the surface of the substrate which is covered by the porous layer.

4. The layer system as claim in claim 1, wherein a thickness of the pore walls varies with a gradient along a radial direction perpendicular to the surface of the substrate and is greater in a vicinity of the surface of the substrate than in a vicinity of an outer surface of the porous layer.

5. The layer system as claim in claim 1, wherein a size of the pores varies with a gradient along a radial direction perpendicular to the surface of the substrate and is smaller in a vicinity of the surface of the substrate than in a vicinity of an outer surface of the porous layer.

6. The layer system as claim in claim 1, wherein edges of pore walls and passages in the pore walls through which a cooling medium flows are partially rounded.

7. The layer system as claim in claim 1, wherein the porous layer has a honeycomb structure.

8. The layer system as claim in claim 1, wherein a protective layer is applied within the porous layer in a region of an outer surface of the porous layer or is applied to the surface of the porous layer.

9. The layer system as claim in claim 8, wherein the protective layer is metallic or ceramic.

10. The layer system as claim in claim 1, wherein the porous layer is metallic or ceramic.

11. The layer system as claim in claim 1, wherein the layer system comprises a turbine component which is selected from the group consisting of: a turbine blade, a turbine vane, and a combustion chamber lining.

12. The layer system as claim in claim 1, wherein the substrate is an iron-base, nickel-base or cobalt-base superalloy.

13. The layer system as claim in claim 1, wherein the layer system comprises a medium having foreign particles which flows through the layer and a size of the pores in the porous layer is larger than a size of the foreign particles.

14. A process for producing a layer system, comprising:
providing a substrate;
producing a porous layer on a surface of the substrate;
arranging a plurality of pores in the porous layer; and
delimiting the pores in the porous layer with a plurality of pore walls,
wherein the pore walls which adjoin the surface of the substrate have a larger cross-sectional area than the pore walls which do not adjoin the surface of the substrate,
wherein the porous layer comprises a plurality of layers and is produced in a plurality of steps.

15. The process as claim in claim 14, wherein the porous layer is joined to the substrate by soldering or by laser stereolithography.

16. The process as claim in claim 14, wherein a plastic is applied to the substrate in layers as a negative form and is cured by a laser to form the pores in the porous layer which are surrounded with a material of the porous layer by casting to produce the porous layer.

17. The process as claim in claim 14, wherein a plastic model of the porous layer is produced and a casting mold for the porous layer is produced from the plastic model by duplicate molding, and the porous layer is produced using the casting mold.

18. The process as claim in claim 14, wherein a printing paste which contains a material of the porous layer is applied to the substrate in layers to produce the porous layer.

19. A process for producing a layer system, comprising:
providing a substrate;
producing a porous layer on a surface of the substrate;
arranging a plurality of pores in the porous layer; and
delimiting the pores in the porous layer with a plurality of pore walls,
wherein the pore walls which adjoin the surface of the substrate have a larger cross-sectional area than the pore walls which do not adjoin the surface of the substrate,
wherein the porous layer is produced together with the substrate in a single step.

20. The process as claim in claim 19, wherein the porous layer is produced together with the substrate by casting.

* * * * *